UNITED STATES PATENT OFFICE.

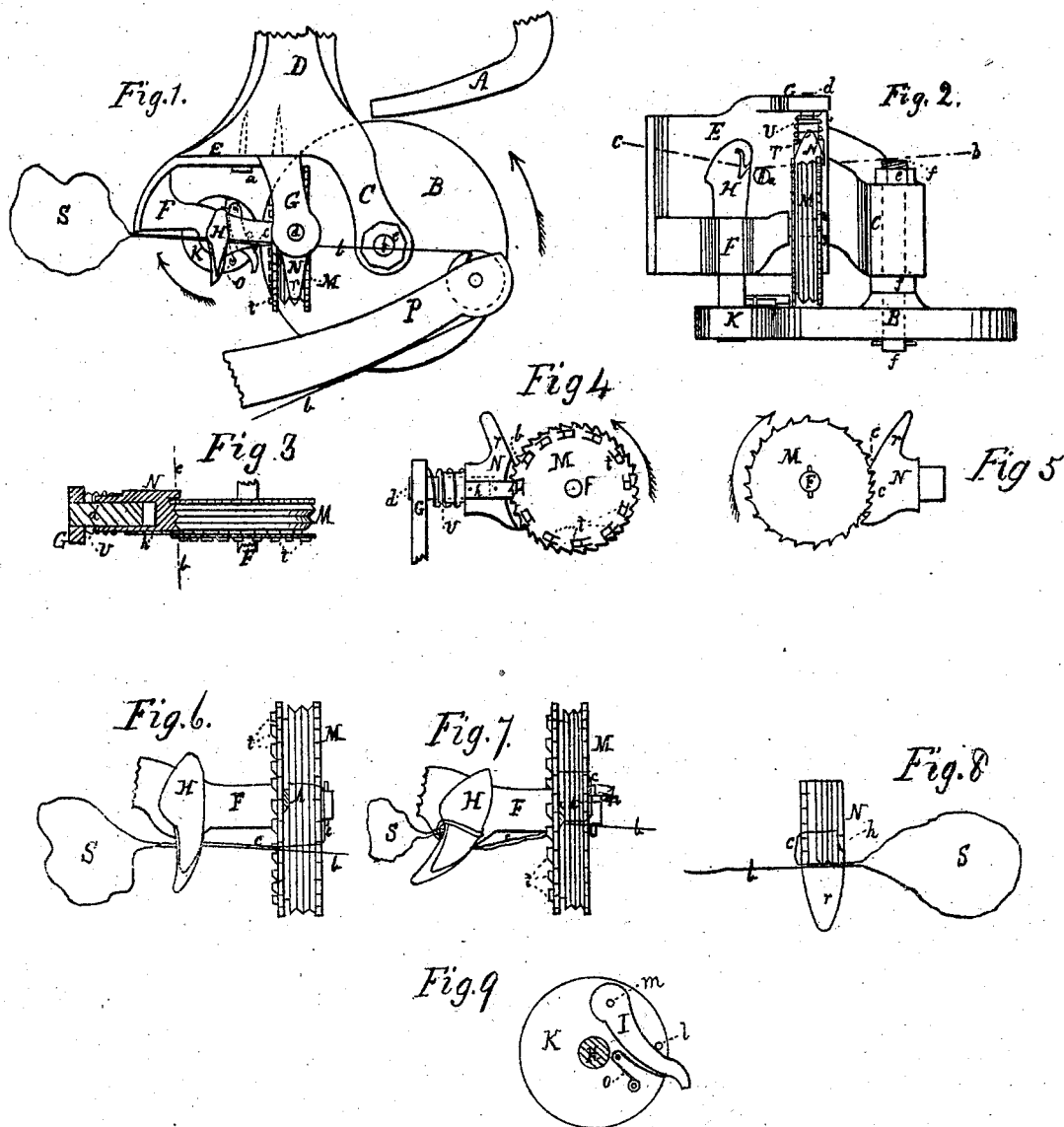

SYLVANUS D. LOCKE, OF JANESVILLE, WISCONSIN.

IMPROVEMENT IN GRAIN-BINDERS.

Specification forming part of Letters Patent No. 97,535, dated December 7, 1869.

*To all whom it may concern:*

Be it known that I, SYLVANUS D. LOCKE, of Janesville, in the county of Rock and State of Wisconsin, have invented certain new and useful Improvements in Grain-Binders; and I do hereby declare that the following is a full, clear, and exact description thereof, reference being had to the accompanying drawings, making a part of this specification, in which—

Figure 1 is a side view. Fig. 2 is an underside view of the parts as shown in in Fig. 1. Fig. 3 is an under-side view of the rotating part of the cord-holder and a section of its follower. Figs. 4 and 5 are inverted views of the front and rear, respectively, of the cord-holder, shown in Fig. 3. Figs. 6 and 7 are views, from the position of the follower, of the rotating part of the cord-holder and the tying mechanism. Fig. 8 is a view, from the position of the rotating part of the cord-holder, of the follower; and Fig. 9 is a side view of the gear K, showing the dog for operating the cord-holder.

The nature of my invention relates to the cord-tying, cord-holding, and cord-cutting mechanism of a grain-binder; and consists in the employment of the devices hereinafter more particularly described.

To enable others skilled in the art to make and use my invention, I will proceed to describe its construction and operation.

In the drawings, A represents a reciprocating rack that may be attached to the "tying-arm," and driven in any desired manner. This rack operates the gear-wheel B that plays in the pinion K, which is secured on the shaft of a rotating tying device, H. The gear-wheel B takes bearing upon any suitable support, as the part C of the arm D. Upon the pinion K is a dog or pawl, I, with its spring O, Figs. 1 and 9, that plays in the teeth or lugs *t* of the rotating part M of the cord-holder. This rotating part is made of the form shown in the drawings—that is, with its circular face grooved and armed with ratchet-shaped teeth, to better hold and operate the cord. This rotating part M of the cord-holder and the rotating tying device H may have any suitable support, as the part F of the head E. The follower N of the rotating part M of the cord-holder has its circular face also grooved and provided with ratchet-shaped teeth, as shown. It is supported and slides upon a stud, *d*, of the head E, and is kept in working position against the rotating part M by a spring, *v*, Figs. 2, 3, and 4. The part *r* of the follower is so shaped as to form an inclined guide to conduct the cord into the position shown at *b* in Fig. 4. Attached to the follower is the stationary knife *h*, that plays in a groove in the rotating part M, Figs. 3, 4, 6, 7, and 8. The rack A may be made to work directly in the pinion K, so dispensing with the gear-wheel B, or the rack may be dispensed with, and the pinion K operated in any desired manner. The dog I and spring O may be attached to the wheel B instead of the pinion K.

When ready to operate my invention, the binding-arm P being in the position shown in Fig. 1, place the cut or free end of the cord in the position above the cord-holder shown by *b*, Fig. 4, and then slightly turning the rotating part M in the direction shown by the arrow, Fig. 4, the end of the cord is taken by the teeth on the rotating part down between it and the follower, as shown by *c*, Figs. 5, 6, and 8, where it is securely held, as the spring *v* drives the concave face of the follower against the rotating part, so crimping the cord in the grooves, as shown in Fig. 3. The grooves prevent the cord from being drawn out laterally, while the teeth on the follower prevent it from escaping upward. The end of the cord being held, the binding-arm P is made to operate in any ordinary manner, thereby carrying with it the cord, and looping it around the bundle, as shown at S, in last-named figures.

At this stage of the operation the rotating hook or other tying device H, as when driven by the rack A, gear B, and pinion K, is made to tie the knot in any manner; and, at the proper point in the movement of the tying device, the dog or pawl I, revolving with the pinion, strikes one of the lugs or spurs *t* on the rotating part M of the cord-holder, so revolving the latter any desired distance, (as the distance between two of the lugs,) and, by means of the teeth on the periphery of the rotating part, driving down the ends of the cord, *b* and *c*, Fig. 6, against the rigid knife *h*, when the cord that is around the bundle is severed from the rest, as shown in Fig. 7. The cut or free end of the cord *b* in the last-named figure is still held, as therein shown, between the parts M and N of the cord-holder. The arm P again operating, the cord is again looped around the bundle, when, the pinion revolving again, operates the tying device H, and turns the rotating part of the cord-holder, so driving down the cord and cutting it off as before. If the tying device is operated by the rack A, the spring O and pawl I are used, but if the pinion K is made to rotate only in one direction, as when driven by gear, the dog I may be rigid or simply a lug or arm on the pinion.

What I claim is—

The arrangement of the part N and cutting device $h$, substantially as described.

SYLVANUS D. LOCKE.

Witnesses:
S. A. SKINNER,
J. L. LAMBERT.